United States Patent [19]

Staples

[11] Patent Number: 5,398,769
[45] Date of Patent: Mar. 21, 1995

[54] AERATOR

[76] Inventor: Clarke H. Staples, 1131 S. 112th St., Lincoln, Nebr. 68520

[21] Appl. No.: 183,712

[22] Filed: Jan. 19, 1994

Related U.S. Application Data

[63] Continuation-in-part of Ser. No. 126,801, Sep. 24, 1993.

[51] Int. Cl.⁶ .................... A01B 45/02; A01B 35/20
[52] U.S. Cl. .................... 172/21; 172/611; 180/191; 404/130
[58] Field of Search ............ 172/21, 22, 611; 414/437; 180/191, 193; 404/130

[56] References Cited

U.S. PATENT DOCUMENTS

| | | | |
|---|---|---|---|
| 2,314,035 | 3/1943 | Dontje | 172/21 |
| 2,550,085 | 4/1951 | Reeves | 172/611 |
| 3,528,508 | 9/1970 | Stevenson | 172/611 |
| 3,636,835 | 1/1972 | Reisser | 404/130 |
| 4,157,734 | 6/1979 | Hines | 172/22 |
| 4,158,391 | 6/1979 | Clements | 172/22 |
| 4,602,687 | 7/1986 | Hansen | 172/22 |
| 4,759,659 | 7/1988 | Copie | 404/130 |
| 4,773,486 | 9/1988 | Huber et al. | 172/22 |
| 5,014,791 | 5/1991 | Kure | 172/611 |
| 5,020,602 | 6/1991 | Dellinger | 172/611 |
| 5,119,880 | 6/1992 | Zehrung, Jr. et al. | 172/22 |
| 5,207,278 | 5/1993 | Hatlen | 172/22 |

*Primary Examiner*—Dennis L. Taylor
*Assistant Examiner*—Spencer Warnick
*Attorney, Agent, or Firm*—Zarley, McKee, Thomte, Voorhees & Sease

[57] ABSTRACT

An aerator includes a frame supported on a pair of forward wheels and a pair of rearward wheels. An aerator head is mounted on a pivot frame on the forward end of the aerator frame, the pivot frame mounted to move the aerator head from a disengaged position above the ground, downwardly to an engaged position wherein tines on the aerator head work the soil. The pivot frame includes a forwardly projecting arm upon which the aerator head is mounted, and a rearwardly projecting arm upon which the forward wheels of the frame are mounted, such that movement of the pivot frame will engage either the forward wheels of the frame or the aerator head. An hydraulic cylinder is mounted between the frame and the pivot frame to selectively move the pivot frame to engage the aerator head or the forward wheels with the ground. A weight transfer apparatus is mounted to the aerator frame and includes a movable weight attached to a swing arm so as to pivot between a first position forward of the aerator head, and a second position rearward of the aerator head, so as to shift weight relative to the aerator head. A link connects the swing arm to the pivot frame, such that movement of the pivot frame to engage the aerator head shifts the weight to the forward position, and movement of the pivot frame to disengage the aerator head shifts the movable weight to the rearward position.

7 Claims, 5 Drawing Sheets

AERATOR

CROSS-REFERENCE TO RELATED APPLICATION

This is a continuation-in-part application of Ser. No. 08/126,801, filed Sep. 24, 1993, allowed.

TECHNICAL FIELD

The present invention relates generally to lawn aerating apparatus, and more particularly to an aerator with forward mounted tine wheels and an improved engagement apparatus for engaging and disengaging the tine wheels with the ground.

Background of the Invention

Aeration apparatus are well known for their beneficial affects in lawn service. However, conventional aerators are heavy relatively cumbersome pieces of equipment for a sole individual to operate.

Conventionally, aerators include a motor and drive mechanism mounted on a frame having forward and rearward sets of wheels, with an aeration drum having tines projecting therefrom located between the forward and rearward sets of wheels. In operation, the forward set of wheels is retracted such that the forward end of the housing rests on the drum and tines, thereby driving the tines into the ground to aerate the ground. One of the main problems with conventional aerators is that the aerator must be tipped back on its rear wheels in order to turn or maneuver the apparatus, thereby lifting the tined drum upward off the ground because of the weight of the aerator, this can become a tiring task.

Yet another problem with conventional aerators lies in the location of the aerator drum. Because the conventional aerator bas a set of retractable wheels forwardly of the aeration drum, it is difficult to aerate portions of the ground located adjacent walls, fences, or other fixed objects.

While the applicant solved many of these problems by the aerator disclosed and claimed in co-pending application Ser. No. 08/126,801, another problem was discovered during the production of the invention. It was found that the user would frequently need to apply force to the aerator in order to cause the aerator tines to engage the soil. In addition, transferring between the aerator head and the driven wheels required extra effort, and could potentially strain the back.

SUMMARY OF THE INVENTION

It is therefore a general object of the present invention to provide an improved aerator.

Yet another object of the present invention is to provide an aerator with a simple and convenient set of retractable drive wheels to permit ease of handling.

A further object of the present invention is to provide an aerator with an aerator head located forwardly of the aerator frame, to reach closely adjacent fixed objects.

Yet another object is to provide an aerator with a weight transfer system to assist in applying weight to the tiller head, and shifting the weight rearwardly of the driven wheels.

These and other objects will be apparent to those skilled in the art.

The aerator of the present invention includes a frame supported on a pair of forward wheels and a pair of rearward wheels. An aerator head is mounted on a pivot frame on the forward end of the aerator: frame, the pivot frame mounted to move the aerator head from a disengaged position above the ground, downwardly to an engaged position wherein tines on the aerator head work the soil. The pivot frame includes a forwardly projecting arm upon which the aerator head is mounted, and a rearwardly projecting arm upon which the forward wheels of the frame are mounted, such that movement of the pivot frame will engage either the forward wheels of the frame or the aerator head. An hydraulic cylinder is mounted between the frame and the pivot frame to selectively move the pivot frame to engage the aerator head or the forward wheels with the ground. A weight transfer apparatus is mounted to the aerator frame and includes a movable weight attached to a swing arm so as to pivot between a first position forward of the aerator head, and a second position rearward of the aerator head, so as to shift weight relative to the aerator head. A link connects the swing arm to the pivot frame, such that movement of the pivot frame to engage the aerator head shifts the weight to the forward position, and movement of the pivot frame to disengage the aerator head shifts the movable weight to the rearward position.

DESCRIPTION OF THE PREFERRED EMBODIMENT

Figure 1:
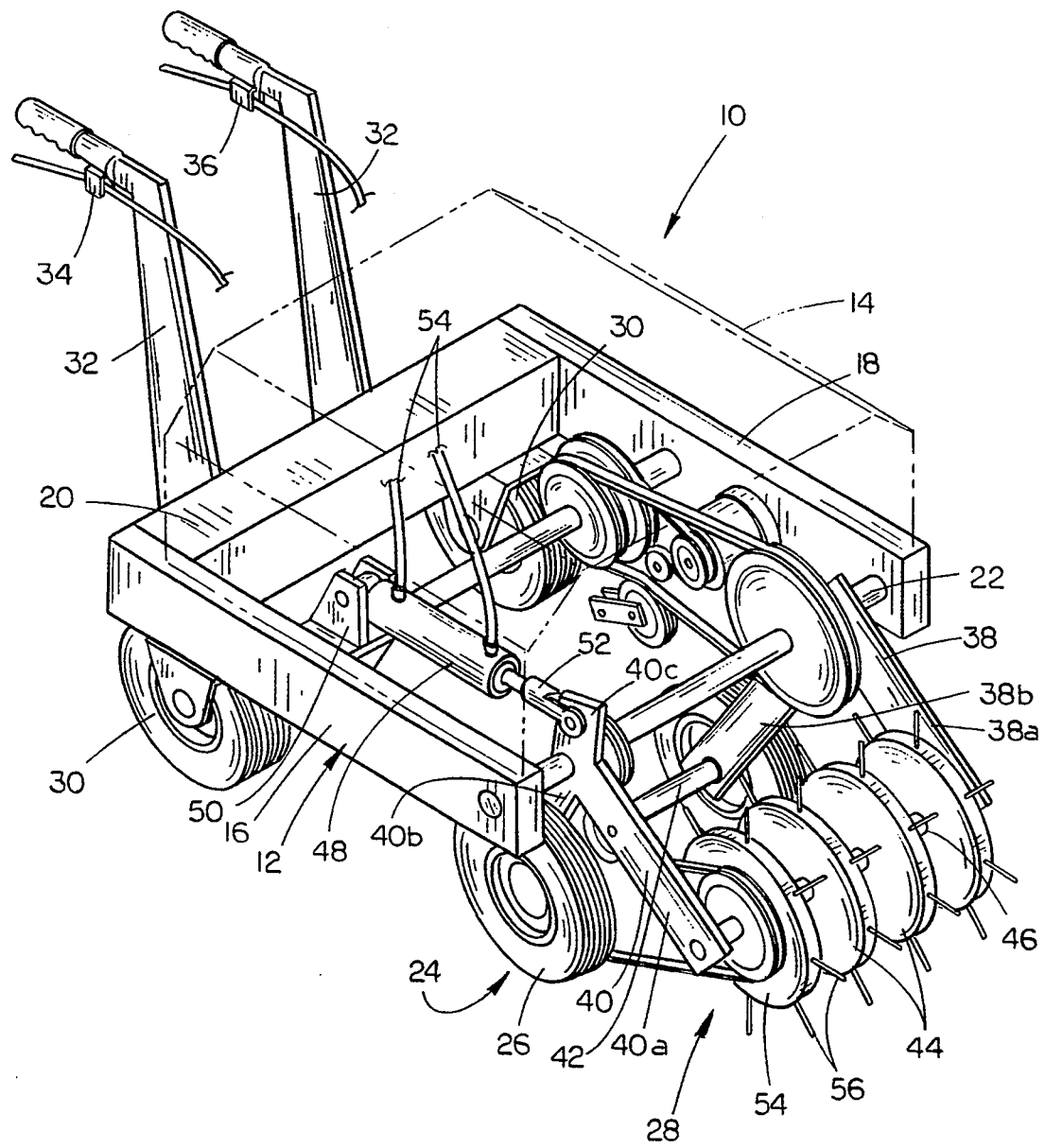
FIG. 1 is a perspective view of the aerator of the present invention, with the motor and motor housing removed to show the drive mechanism.

Referring now to the drawings, in which similar or corresponding parts are identified with the same reference numeral, and more particularly to FIG. 1, the aerator of the present invention is designated generally at 10 and includes a support frame 12 and a conventional drive motor (not shown) mounted within a motor housing 14 (shown in broken lines).

Frame 12 includes a pair of side frame members 16 and 18 having forward and rearward ends, with a rearward frame member 20 connecting the rearward ends of side frames 16 and 18, thereby forming a generally U-shaped frame. A generally cylindrical shaft 22 is mounted between the forward ends of side frames 16 and 18 and serves as the pivotal axis for a pivot frame 24 which supports a pair of drive wheels 26 and an aerator head 28, as described in more detail hereinbelow.

A pair of caster wheels 30 are mounted at the rearward ends of side frames 16 and 18 and are freely rotating and free to turn, such that the rearward end of frame 12 is easily moved relative to drive wheels 26 and aerator head 28. A pair of rearwardly projecting handles 32 are mounted to rearward frame number 20 to guide aerator 10, and to support operator control switches 34 and 36.

Pivot frame 24 includes a right and left bracket 38 and 40 pivotally connected to shaft 22. Bracket 38 includes a forwardly projecting arm 38a with upper and lower ends and a rearwardly projecting arm 38b, with upper and lower ends. The bracket 38 is pivotally connected at the junction of the upper ends of arms 38a and 38b to shaft 22. Left bracket 40 includes a forward arm 40a, rearward arm 40b, and an upwardly projecting leg 40c, bracket 40 being pivotally connected to shaft 22 at the junction of arms 40a, 40b and leg 40c. The aerator head is operably mounted on the lower ends of the forward arms 38a and 40a and the pair of drive wheels 26 are mounted on the lower ends of the rearward arms 38b and 40b.

Drive wheels 26 are mounted on an axle 42 for simultaneous rotation, with axle 42 rotatably journaled between the lower ends of right bracket rear leg 38b and left bracket rear leg 40b. Similarly, a plurality of tine wheels 44 are mounted on an axle 46 for rotation therewith, axle 46 being rotatably journaled between the lower ends of right bracket forward leg 38a and left bracket forward leg 40a.

An hydraulic cylinder 48 is pivotally connected at its rearward end to a bracket 50 mounted on side frame member 16. An extensible shaft 52 projects from the forward end of cylinder 48 and is pivotally connected at its forward end to leg 40c of left bracket 40. Hydraulic lines 54 extend to a conventional hydraulic valve and pump (not shown) which is operated by control switch 34, so as to extend or retract shaft 52.

Figure 2:
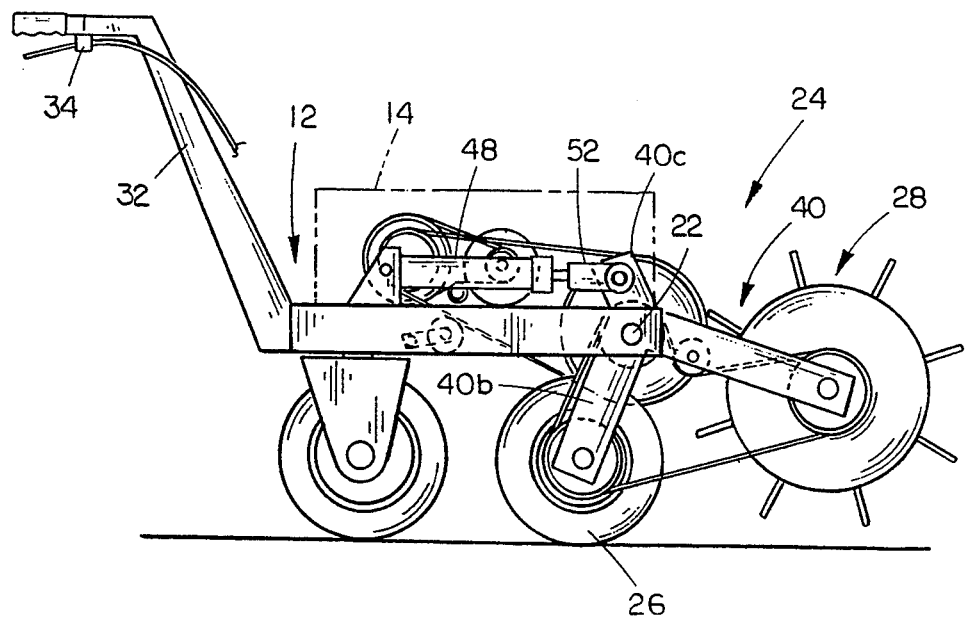
FIG. 2 is a side elevational view of the apparatus shown in FIG. 1, with the forward drive wheels engaged with the ground.
Figure 3:
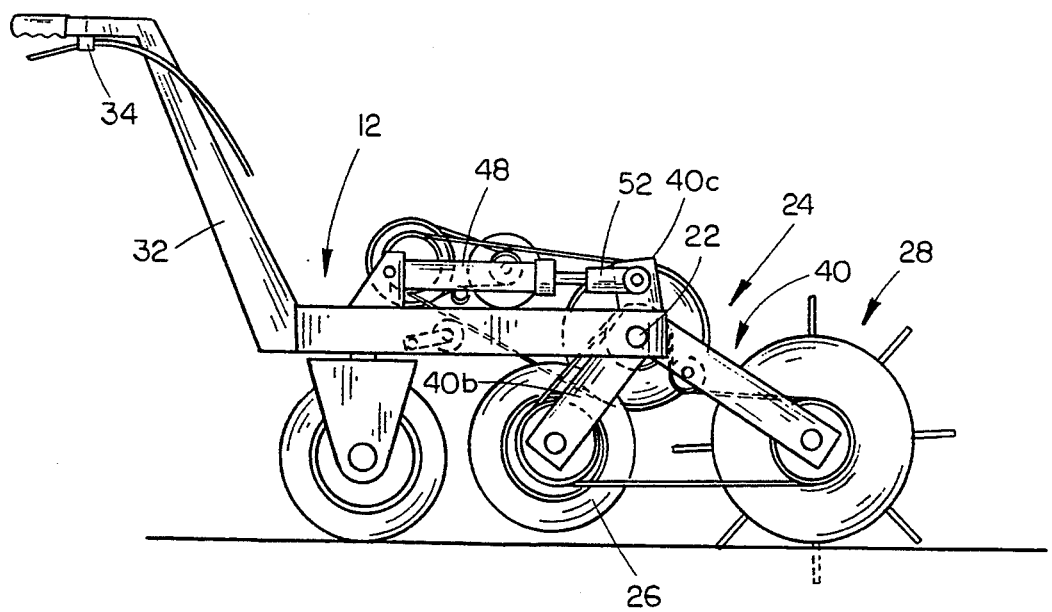
FIG. 3 is an elevational view similar to FIG. 2, but with the aerator head in engagement with the ground.

Referring to FIGS. 2 and 3, the actuation of cylinder 48 moves pivot frame 24 so as to engage either drive wheels 26 (as shown in FIG. 2) or aerator head 28 (as shown in FIG. 3) with the ground. Thus, the retracted position of shaft 52 pulls leg 40c rearwardly and pivots left bracket 40 about shaft 22 so as to pivot arm 40b forwardly so as to engage drive wheels 26 with the ground. Extending shaft 52 will move pivot frame 24 about shaft 22 so as to lower aerator head 28 until it engages the ground. Further pivotal movement of pivot frame 24 will cause shaft 22 in the forward end of frame 12 to move upwardly, thereby disengaging drive wheels 26 from the ground.

Referring again to FIG. 1, each tine wheel 44 includes a disk 54 with a plurality of cylindrical tines 56 projecting radially therefrom. Tine wheels 44 are preferably uniformly spaced along axle 46.

Figure 4:
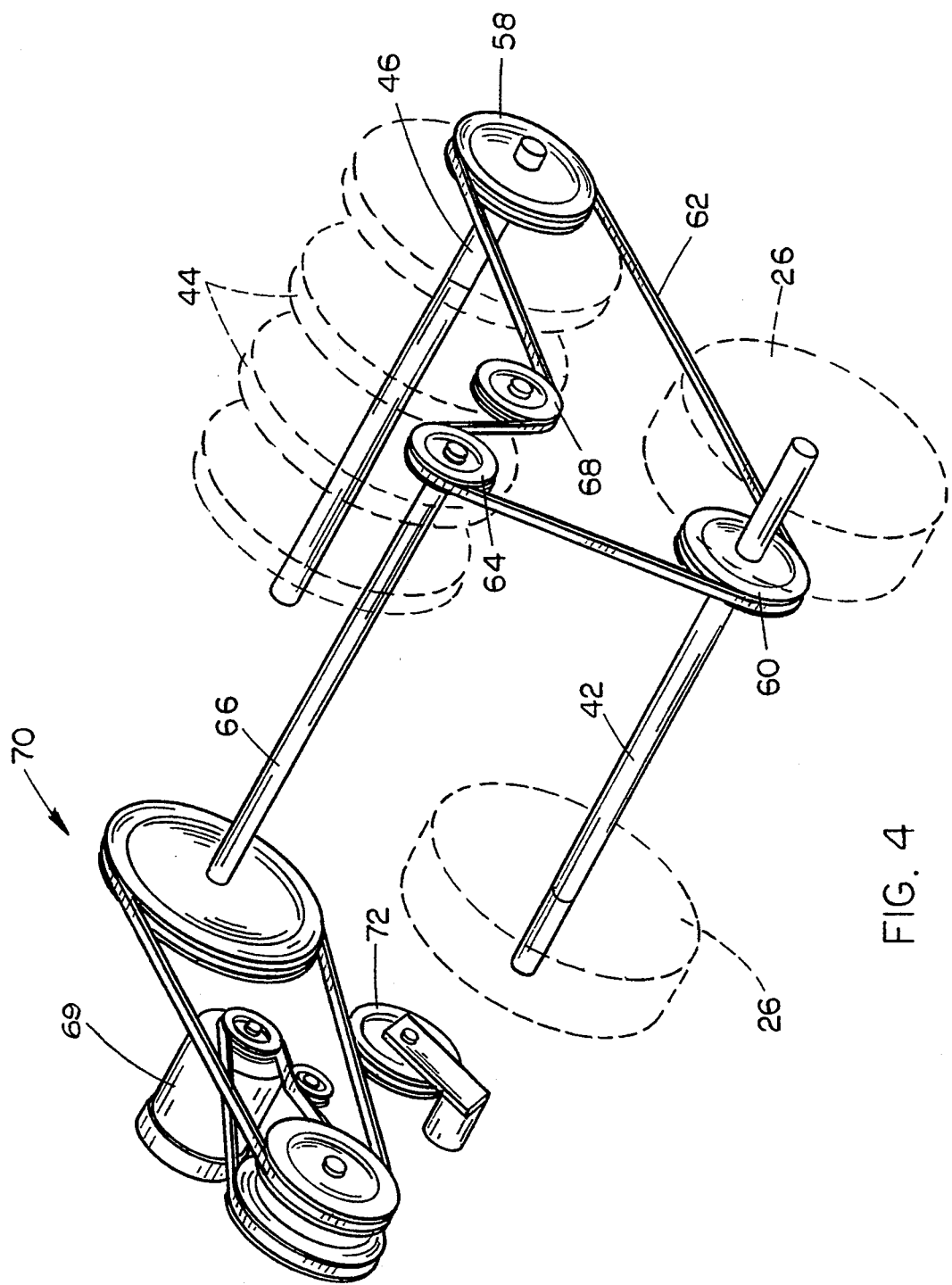
FIG. 4 is a perspective view of the drive mechanism of the present invention.

FIG. 4 is a perspective view of the drive mechanism for tine wheels 44 and drive wheels 26. A drive pulley 58 is mounted on tine wheel axle 46 for rotation therewith. A second drive pulley 60 is mounted on drive wheel axle 42 for rotation therewith. A drive belt 62 is journaled about drive pulleys 58 and 60, and thence over a drive pulley 64 mounted on a drive shaft 66, such that both drive wheel axle 42 and tine wheel axle 46 are simultaneously driven by drive shaft 66. A free wheeling pulley 68 is located to place tension on drive belt 62 to maintain engagement of drive belt 62 with all three drive pulleys 58, 60 and 64. Drive shaft 66 is interconnected to a drive motor 69 through a series of reduction gears 70, in a conventional fashion. A clutch 72 is connected to control switch 36 (see FIG. 1) so as to engage to disengage motor 69 with drive shaft 66.

Figure 5:
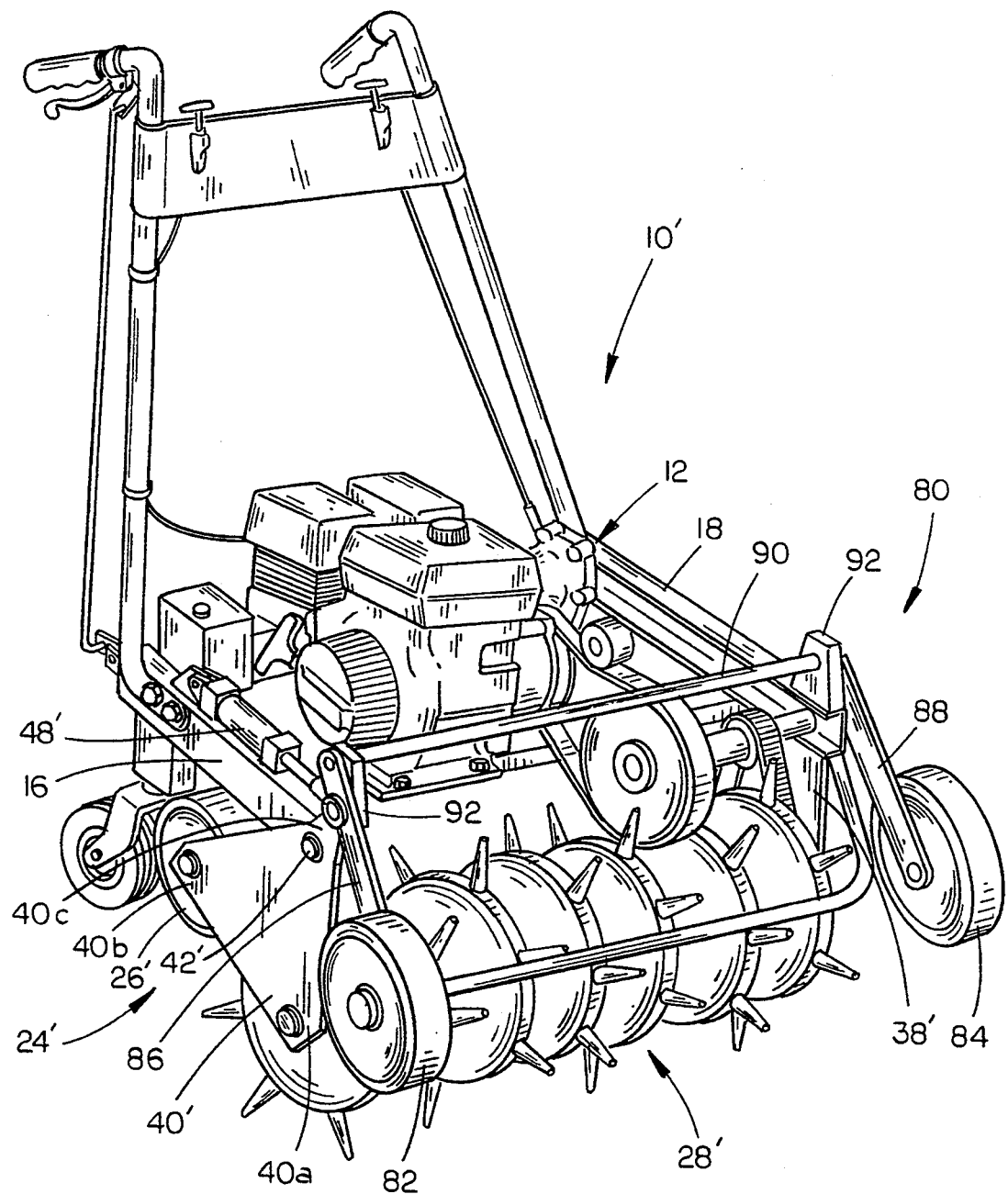
FIG. 5 is a perspective view of a second embodiment of the aerator.
Figure 6:
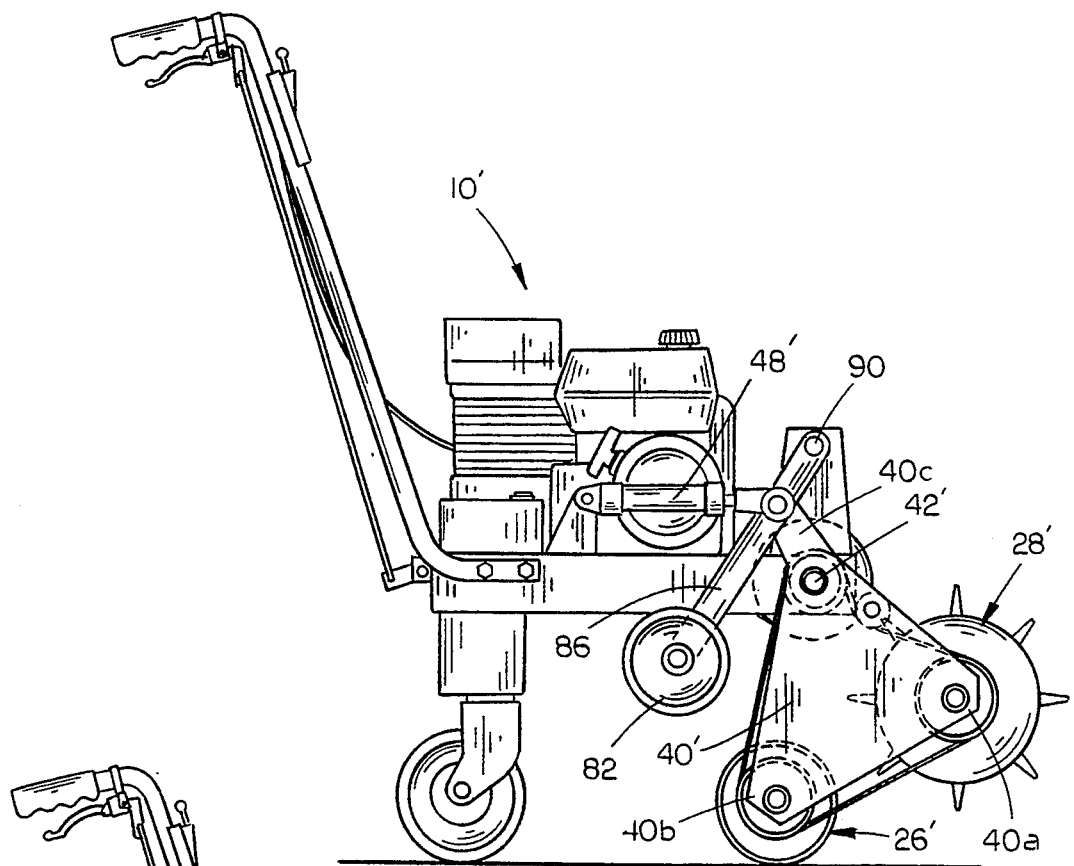
FIG. 6 is a side elevational view of the apparatus shown in FIG. 5, with the forward drive wheels engaged with the ground.
Figure 7:
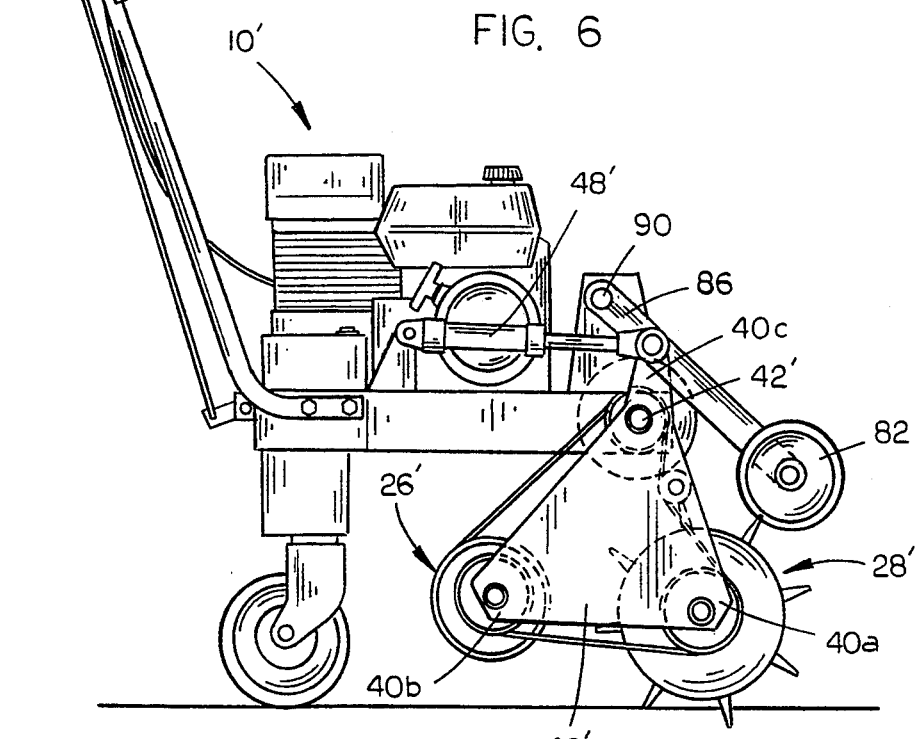
FIG. 7 is an elevational view similar to FIG. 6, but with the aerator head in engagement with the ground.

Referring now to FIGS. 5–7, a second embodiment of the aerator is designated generally at 10' and is generally identical to the first embodiment shown in FIG. 1, except for the addition of a weight transfer apparatus designated generally at 80. Weight transfer apparatus 80 includes a pair of disk-shaped weights 82 and 84 mounted on the lower end of a pair of left and right swing arms 86 and 88, which are connected together at their upper ends by connecting rod 90. Connecting rod 90 is pivotally mounted through bearings 92 affixed to side frame members 16 and 18, such that weights 82 and 84 will swing about the longitudinal rotational axis of connecting rod 90, exteriorly of frame 12 of aerator 10'.

As with the first embodiment, a pivot frame 24' supports a pair of drive wheels 26', and an aerator head 28'. Pivot frame 24' includes a right and left bracket 38' and 40' pivotally connected to side frame members 18 and 16, respectively. Since brackets 38' and 40' are identical, only bracket 40' will be described in detail hereinbelow. Bracket 40' is generally triangular in shape, with aerator head 28' rotatably mounted at a forward corner 40a thereon, and drive wheel 26' mounted to a rearward corner 40b. A leg 40c projects upwardly at the third corner of bracket 40' adjacent the pivot point on axle 42'.

As with the first embodiment, a hydraulic cylinder 48' is connected to projecting leg 40c, to pivot bracket 40' about axle 42' so as to engage either aerator head 28' or drive wheels 26', as shown in FIGS. 6 and 7. In addition, the juncture of cylinder 48' with leg 40c is also pivotally connected to swing arm 86 between connecting rod 90 and weight 82. In this way, extension and retraction of cylinder 48' will cause swing arm 86 to pivot on connecting rod 90 and move weight 82 between a rearward position, shown in FIG. 6, and a forward position, shown in FIG. 7. With weight transfer apparatus positioned forwardly, it can be seen that weights 82 and 84 are located forward of aerator head 28', and thereby apply extra weight to the aerator head. Retraction of cylinder 48' swings weights 82 and 84 rearwardly as the drive wheels 26' engage the ground (as shown in FIG. 6) to a position rearward of drive wheels 26', and thereby shifting the center of gravity of the aerator rearwardly. This in turn assists in maneuvering aerator 10' on drive wheels 26'.

Whereas the invention has been shown and described in connection with the preferred embodiment thereof, it will be understood that many modifications, substitutions and additions may be made which are within the intended broad scope of the appended claims. There has therefore been shown and described an improved aerator which accomplishes at least all of the above stated objects.

I claim:

1. An aerator, comprising:
    a frame having a plurality of support wheels, at least one of said wheels being selectively driven to propel the frame;
    a pivot frame pivotally mounted to said frame for movement between first and second positions;
    an aerator head with soil working means operably mounted on said pivot frame for movement therewith between an engaged position with the soil working means in engagement with the ground when the pivot frame is in the first position and a disengaged position with the soil Working means raised out of contact with the ground when the pivot frame is in the second position;
    motor means on said frame for selectively driving said driven wheel to propel the aerator; means for selectively pivoting said pivot frame between the first and second positions; and weight transfer means for shifting a movable weight between a forward position located generally forwardly of the aerator head, and a rearward position located generally rearwardly of the aerator head;

said weight transfer means operably connected to said pivot frame to shift the movable weight to the forward position when the pivot frame is in the first position, and to shift the movable weight to the rearward position when the pivot frame is in the second position.

2. The aerator of claim 1:

wherein said support wheels include at least one forwardly mounted wheel; and wherein said forward wheel is rotatably mounted on said pivot frame and located to engage the ground and support the frame when the pivot frame is in the second position, and raised above the ground when the pivot frame is in the first position.

3. The aerator of claim 2, wherein said pivot frame includes:

a forward arm having upper and lower ends pivotally connected to said frame at the upper end thereof;

a rearward arm having upper and lower ends rigidly connected at the upper end to the upper end of the forward arm, for pivotal movement therewith; and wherein said aerator head is operably mounted on the lower end of the forward arm and the forward wheel is rotatably mounted on the lower end of the rearward arm.

4. The aerator of claim 2, wherein said movable weight second position is located generally rearwardly of the forward wheel.

5. The aerator of claim 1, wherein said weight transfer means includes:

a first swing arm pivotally connected at an upper end to said frame;

said movable weight mounted on a lower end of said swing arm for pivotal movement therewith; and wherein said first swing arm is pivotally connected to said means for selectively pivoting said pivot frame for movement between said forward and rearward position as said pivot frame moves between said first and second position.

6. The aerator of claim 5, wherein said pivotal connection between said swing arm and said means for selectively pivoting said pivot frame is located at a position between the movable weight and the pivotal connection of the swing arm to the frame.

7. The aerator of claim 5, wherein said weight transfer means further includes:

a second swing arm pivotally connected at an upper end to said frame;

a second movable weight mounted on a lower end of said second swing arm for pivotal movement therewith; and a connecting rod connecting said first and second swing arms for simultaneous pivotal movement.

* * * * *